(12) United States Patent
Beuterbaugh et al.

(10) Patent No.: US 10,723,939 B2
(45) Date of Patent: Jul. 28, 2020

(54) METHODS AND COMPOSITIONS FOR TREATING A SUBTERRANEAN FORMATION WITH A POLYMERIC ADDITIVE COMPOSITE

(71) Applicant: Halliburton Energy Services, Inc., Houston, TX (US)

(72) Inventors: Aaron M. Beuterbaugh, Spring, TX (US); Enrique A. Reyes, Tomball, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 16/098,069

(22) PCT Filed: Jun. 27, 2016

(86) PCT No.: PCT/US2016/039586
§ 371 (c)(1),
(2) Date: Oct. 31, 2018

(87) PCT Pub. No.: WO2018/004516
PCT Pub. Date: Jan. 4, 2018

(65) Prior Publication Data
US 2019/0093007 A1 Mar. 28, 2019

(51) Int. Cl.
*E21B 37/06* (2006.01)
*C09K 8/82* (2006.01)
(Continued)

(52) U.S. Cl.
CPC ............... *C09K 8/82* (2013.01); *C09K 8/04* (2013.01); *C09K 8/536* (2013.01); *C09K 8/54* (2013.01);
(Continued)

(58) Field of Classification Search
CPC . C09K 8/82; C09K 8/04; C09K 8/536; C09K 8/602; C09K 8/68; C09K 8/725; C09K 8/92; C09K 8/94; C09K 2208/20; C09K 2208/22; C09K 2208/24; C09K 2208/26; C09K 2208/32; E21B 37/06; E21B 41/02
See application file for complete search history.

(56) References Cited

U.S. PATENT DOCUMENTS 3,811,519 A 5/1974 Driver
4,035,023 A 7/1977 Cockrell
(Continued)

FOREIGN PATENT DOCUMENTS

AU 2012381021 10/2015
WO 2016010539 1/2016

OTHER PUBLICATIONS

International Search Report and Written Opinion of PCT Application No. PCT/US2016/039586 dated Mar. 13, 2017: pp. 1-11.

*Primary Examiner* — Silvana C Runyan
(74) *Attorney, Agent, or Firm* — Chamberlain Hrdlicka (57) ABSTRACT

Methods and compositions for treating a subterranean formation are provided. The method can include introducing a treatment fluid into the subterranean formation containing an aqueous downhole fluid. The treatment fluid can contain one or more polymers, a particulate additive containing one or more additives, and one or more organic solvents. The polymer is at least partially dissolved in the organic solvent and the particulate additive is at least partially suspended in the organic solvent. The method can also include combining the treatment fluid with the aqueous downhole fluid to produce a polymeric additive composite and a fluid mixture within the subterranean formation. The polymeric additive composite contains the particulate additive at least partially embedded in the polymer to prevent an uncontrolled release of the particulate additive into the fluid mixture.

18 Claims, 1 Drawing Sheet

(51) Int. Cl.
*C09K 8/04* (2006.01)
*C09K 8/88* (2006.01)
*C09K 8/68* (2006.01)
*C09K 8/536* (2006.01)
*C09K 8/54* (2006.01)
*C09K 8/60* (2006.01)
*C09K 8/72* (2006.01)
*C09K 8/92* (2006.01)
*C09K 8/94* (2006.01)
*E21B 41/02* (2006.01)

(52) U.S. Cl.
CPC ............... *C09K 8/602* (2013.01); *C09K 8/68* (2013.01); *C09K 8/725* (2013.01); *C09K 8/88* (2013.01); *C09K 8/92* (2013.01); *C09K 8/94* (2013.01); *E21B 37/06* (2013.01); *C09K 2208/20* (2013.01); *C09K 2208/22* (2013.01); *C09K 2208/24* (2013.01); *C09K 2208/26* (2013.01); *C09K 2208/32* (2013.01); *E21B 41/02* (2013.01)

(56) References Cited

U.S. PATENT DOCUMENTS

| | | | |
|---|---|---|---|
| 4,828,050 A | 5/1989 | Hashimoto | |
| 6,352,110 B1 | 3/2002 | Langseth et al. | |
| 6,644,848 B1 | 11/2003 | Clayton et al. | |
| 6,736,905 B2 | 5/2004 | Smith et al. | |
| 6,826,343 B2 | 11/2004 | Davis et al. | |
| 7,021,379 B2 | 4/2006 | Nguyen | |
| 7,036,587 B2 | 5/2006 | Munoz, Jr. et al. | |
| 8,016,040 B2 | 9/2011 | Ali et al. | |
| 8,697,612 B2 | 4/2014 | Todd et al. | |
| 9,255,468 B2 | 2/2016 | Reyes et al. | |
| 9,822,636 B2 | 11/2017 | Chu | |
| 2004/0261996 A1* | 12/2004 | Munoz, Jr. | C09K 8/516 166/279 |
| 2005/0061504 A1* | 3/2005 | Frost | C09K 8/845 166/279 |
| 2005/0167105 A1 | 8/2005 | Roddy et al. | |
| 2006/0283591 A1 | 12/2006 | Willberg et al. | |
| 2008/0139412 A1* | 6/2008 | Fuller | C09K 8/52 507/219 |
| 2010/0197527 A1 | 8/2010 | Todd et al. | |
| 2011/0168395 A1 | 7/2011 | Welton et al. | |
| 2011/0185815 A1 | 8/2011 | McCann | |
| 2012/0004147 A1 | 1/2012 | Seetz et al. | |
| 2012/0024526 A1 | 2/2012 | Liang et al. | |
| 2012/0048549 A1 | 3/2012 | Willberg et al. | |
| 2014/0060828 A1 | 3/2014 | Nguyen et al. | |
| 2015/0232744 A1 | 8/2015 | Beuterbaugh et al. | |
| 2016/0032175 A1 | 2/2016 | Norman et al. | |
| 2017/0298265 A1* | 10/2017 | Smith | C09K 8/54 |
| 2018/0127882 A1* | 5/2018 | Reyes | C09K 8/74 |

* cited by examiner

METHODS AND COMPOSITIONS FOR TREATING A SUBTERRANEAN FORMATION WITH A POLYMERIC ADDITIVE COMPOSITE

BACKGROUND

This section is intended to provide relevant contextual information to facilitate a better understanding of the various aspects of the described embodiments. Accordingly, it should be understood that these statements are to be read in this light and not as admissions of prior art.

A variety of treatment fluids can be used in subterranean formations during numerous types of process operations. Illustrative process operations can include, but are not limited to, drilling operations, perforating and/or fracturing operations, proppant packing operations, acidification operations, viscosity control operations, scale dissolution and removal operations, fluid loss operations, or sand control operations. Such treatment fluids can be used to increase hydrocarbon production from a subterranean formation, as well as the efficiency of such hydrocarbon production. Therefore, it will be appreciated that improvements are continually needed in the field of treatment fluids for use in subterranean formations.

BRIEF DESCRIPTION OF THE DRAWINGS

For a detailed description of the embodiments of the invention, reference will now be made to the accompanying drawings in which.

DETAILED DESCRIPTION

The present disclosure includes methods for producing a polymeric additive composite within a subterranean formation, methods for treating the subterranean formation with the polymeric additive composite, and treatment fluid compositions that can be used to produce the polymeric additive composite. The polymeric additive composite can include one or more additives in particulate form embedded in one or more degradable polymers to prevent an uncontrolled release of the particulate additive into the subterranean formation. Once the polymeric additive composite is positioned at a desired downhole location, the polymer within the polymeric additive composite can be selectively degraded to release the particulate additive at such desired location within the subterranean formation.

In one or more embodiments, a method for treating a subterranean formation containing an aqueous downhole fluid can include introducing a treatment fluid into the subterranean formation. The treatment fluid can contain one or more polymers, one or more particulate additives, and one or more organic solvents. The polymer is at least partially or completely soluble in the organic solvent and therefore can be at least partially or completely dissolved in the organic solvent. The additive is at least partially or completely insoluble in the organic solvent and therefore can be at least partially or completely suspended or flocculated in the organic solvent.

The method can include combining the treatment fluid with the aqueous downhole fluid to produce, form, or otherwise make a polymeric additive composite and a fluid mixture within the subterranean formation. For example, the polymeric additive composite can be precipitated within the fluid mixture. The fluid mixture can include, but is not limited to, the aqueous downhole fluid and the organic solvent. For example, the organic solvent can be displaced from the treatment fluid by water and can defuse into the aqueous downhole fluid contained downhole in the subterranean formation to form the fluid mixture. The polymeric additive composite can include the particulate additive (e.g., the additive in particulate form) and the polymer at least partially disposed about the particles containing the additive. For example, at least a portion of the particulate additive can be at least partially or completely embedded in the polymer to produce the polymeric additive composite and to prevent an uncontrolled release of the particulate additive into the fluid mixture. In some examples, at least a portion of the particulate additive can be at least partially or completely encapsulated, covered, or otherwise coated by the polymer to produce the polymeric additive composite and to prevent an uncontrolled release of the particulate additive into the fluid mixture.

In one or more embodiments, the polymer is or contains one of more degradable polymers. As used herein, a degradable polymer or material is capable of undergoing an irreversible degradation downhole. The term "irreversible" as used herein means that the degradable polymer or material once degraded should not recrystallize or reconsolidate while downhole in the subterranean formation, that is, the degradable polymer or material should degrade in situ but should not recrystallize or reconsolidate in situ. The terms "degradable," "degradation," "degrading," or "degraded" refer to both the two relatively extreme cases of degradation that the degradable polymer or material may undergo, that is, heterogeneous (or bulk erosion) and homogeneous (or surface erosion), and any stage of degradation in between these two. Methods of degradation can be or include, but are not limited to, hydrolysis, solvolysis, oxidation, reduction, or dissolution and can also include increasing or decreasing the pH value or the temperature of the solution or environment containing the degradable polymer or material.

Illustrative degradable polymers can be or include, but are not limited to, one or more of: polyesters, poly(alkylene dicarboxylates), polyanhydrides, polycarbonates, poly(dioxepan-2-ones), poly(amino acids), poly(alkylene oxides), polyphosphazenes, polyvinyl alcohols, polyalkenes, polybutadienes, polyacrylates, polystyrenes, rubbers, amide elastomers, silicone hydrogels, copolymers thereof, derivatives thereof, salts thereof, hydrates thereof, or any combination thereof. For example, the polymer can be or include, but is not limited to, a degradable aliphatic polyester. Illustrative polyesters that are degradable polymers can be or include, but are not limited to, one or more of: aliphatic polyesters, poly($\alpha$-hydroxy) acids, poly(hydroxy alkanoates), poly($\beta$-hydroxy alkanoates), poly($\omega$-hydroxy alkanoates), poly(orthoesters), copolymers thereof, derivatives thereof, salts thereof, hydrates thereof, or any combination thereof. In one or more examples, the polymer can be or include, but is not limited to, a polylactic acid (PLA), a polyglycolic acid (PGA), a polylactide, a polyglycolide, a copolymer thereof, a derivative thereof, a salt thereof, a hydrate thereof, or any combination thereof. Illustrative degradable rubbers can be or include, but are not limited to, one or more of: urethane-containing rubber, thiol-containing rubbers, butyrate-containing rubbers, derivatives thereof, or any mixture thereof. Illustrative elastomers or amide elastomers can be or include, but are not limited to, polyester elastomers, polyamide elastomers, polyester amide elastomers, derivatives thereof, or any mixture thereof.

The additive, such as the particulate additive, can be or include, but is not limited to, one or more of: chelating agents, scale inhibitors, corrosion inhibitors, oxidizers, breakers, etchants, acids, bases, pH control agents, dispersants, surfactants, flocculants, gel stabilizers, gelling agents, foaming agents, antifoaming agents, or any combination thereof. The additive can have a solid state when disposed in at least ambient conditions and up to the more severe conditions, including greater temperatures and pressures, within a downhole environment. For example, the additive can have a solid state at temperatures of about 10° C. to about 200° C., about 15° C. to about 150° C., or about 20° C. to about 100° C. and at a pressure of about 0.05 MPa to about 5 MPa or about 0.1 MPa to about 3.5 MPa. The additive can be in particulate form, that is, the additive can be in the form of a plurality of particles and can be referred to as a particulate additive. The particulate additive can have an average particle size of about 1 μm to about 10 mm, or larger. In some examples, the particulate additive can have an average particle size of about 1 μm to less than 1 mm, about 10 μm to less than 1 mm, or about 100 μm to less than 1 mm. In other examples, the particulate additive can have an average particle size of 1 mm to about 10 mm, 1 mm to about 5 mm, or about 2 mm to about 10 mm.

In one of more embodiments, the particulate additive can be or include one or more chelating agents. The chelating agent can be or include one or more acids of the chelating agent, one or more salts of the chelating agent, one or more hydrates of the chelating agent, one or more esters of the chelating agent, derivatives thereof, or combinations thereof. Salts of the chelating agent can be, but are not limited to, monovalent, divalent, trivalent, tetravalent, or have greater valences. Salts of the chelating agent can include one or more alkali metals (e.g., lithium, sodium potassium, or cesium), one or more alkaline earth metals (e.g., beryllium, magnesium, or calcium), one or more other metals, or any mixture thereof. In some examples, the salts of the chelating agent can be partially or completely soluble in water having a pH of about 3 or greater. In other examples, the chelating agent or salt thereof can be less soluble or have a lower solubility than the polymer in the water phase of the aqueous downhole fluid and/or the fluid mixture. The lower solubility of the chelating agent or salt thereof can provide that the chelating agent is at least embedded, encapsulated, covered, or coated in the polymeric additive composite by the degradable polymer, thereby preventing the uncontrolled release of the chelating agent due to the dissolution of the degradable polymer within the subterranean formation.

In some examples, the chelating agent can be or include one or more phosphonate chelating agents. Illustrative phosphonate chelating agents can be or include, but are not limited to, N-(phosphonomethyl)iminodiacetic acid (PMIDA), aminomethylphosphonic acid (AMPA), vinylphosphonic acid, dimethyl methylphosphonate (DMMP), 1-hydroxyethylidene-1,1-diphosphonic acid (HEDP), aminotris(methylenephosphonic acid) (ATMP), ethylenediaminetetra(methylenephosphonic acid) (EDTMP), tetramethylenediaminetetra(methylenephosphonic acid) (TDTMP), hexamethylenediaminetetra(methylenephosphonic acid) (HDTMP), diethylenetriaminepenta(methylenephosphonic acid) (DTPMP), phosphonobutanetricarboxylic acid (PBTC), 2-carboxyethyl phosphonic acid (CEPA), 2-hydroxyphosphonocarboxylic acid (HPAA), aminotris(m-ethylenephosphonic acid) (AMP), N,N-bis(phosphonom-ethyl)glycine (BPMG), a salt thereof, a hydrate thereof, an acid thereof, an ester thereof, a derivative thereof, or any combination thereof.

Other chelating agents can be or include, but are not limited to, glutamic acid diacetic acid (GLDA), methylglycine diacetic acid (MGDA), β-alanine diacetic acid (β-ADA), ethylenediaminedisuccinic acid, S,S-ethylenediaminedisuccinic acid (EDDS), iminodisuccinic acid (IDS), hydroxyiminodisuccinic acid (HIDS), polyamino disuccinic acids, N-bis[2-(1,2-dicarboxyethoxyl)ethyl]glycine (BCA6), N-bis[2-(1,2-dicarboxyethoxyl)ethyl]aspartic acid (BCA5), N-bis[2-(1,2-dicarboxyethoxyl)ethyl]methylglycine (MCBA5), N-tris[(1,2-dicarboxyethoxy)ethyl]amine (TCA6), N-bis[2-(carboxymethoxy)ethyl]glycine (BCA3), N-bis[2-(methylcarboxymethoxy)ethyl]glycine (MCBA3), N-methyliminodiacetic acid (MIDA), iminodiacetic acid (IDA), N-(2-acetamido)iminodiacetic acid (ADA), hydroxymethyliminodiacetic acid, 2-(2-carboxyethylamino) succinic acid (CEAA), 2-(2-carboxymethylamino)succinic acid (CMAA), diethylenetriamine-N,N''-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N,N-diacetic acid, aspartic acid-N-monoacetic acid, a polymer thereof, a salt thereof, a hydrate thereof, an acid thereof, an ester thereof, a derivative thereof, or any combination thereof.

The organic solvent can be any organic solvent or a combination of two or more organic solvents that dissolves the polymer. The organic solvent can be or include, but is not limited to, nitriles, ketones, aldehydes, formamides, alkanes, halogenated alkanes, halogenated carboxylic acids, halogenated alcohols, aromatics, amines, cyclic amines, pyridines, pyrrolidones, ethers, cyclic ethers, esters, cyclic esters, furans, halogenated derivatives thereof, or any mixture thereof. Illustrative solvents and organic solvents, can be or include, but are not limited to, acetonitrile, dimethylformamide, acetone, methyl ethyl ketone (MEK), diethyl ether, tetrahydrofuran (THF), pyridine, N-methyl-2-pyrrolidone (NMP), dimethyl sulfoxide, butyrolactone, benzene, toluene, trifluoroacetic acid, hexafluoro-2-propanol, dioxane, ethyl lactate, dichloromethane, chloroform, carbon tetrachloride, pentane, hexane, heptane, octane, halogenated derivatives thereof, alkylated derivatives thereof, isomers thereof, or any mixture thereof.

In one or more examples of components contained in the treatment fluid, the polymer can be or include one or more polylactic acids, a copolymer thereof, a derivative thereof, a salt thereof, a hydrate thereof, or any combination thereof, the particulate additive can be or include PMIDA, and the organic solvent can be or include, but is not limited to, acetonitrile, dimethylformamide, acetone, trifluoroacetic acid, or any mixture thereof.

The treatment fluid can contain an amount of polymer to be partially or completely dissolved by the organic solvent. In some examples of the treatment fluid, the organic solvent is saturated by the polymer, where the concentration of the polymer is at or near the saturation point of the organic solvent, such as in a solution. In other examples of the treatment fluid, the organic solvent is super-saturated by the polymer, where the concentration of the polymer is greater than the saturation point of the organic solvent and a portion of the polymer is undissolved in the organic solvent, such as in a gel, a suspension, or a flocculation.

The treatment fluid can contain about 10 weight percent (wt %), about 20 wt %, about 30 wt %, about 33 wt %, or about 40 wt % to about 50 wt %, about 60 wt %, about 67 wt %, about 70 wt %, about 80 wt %, or about 90 wt % of the polymer, based on a combined solids weight of the polymer and the particulate additive. For example, the treatment fluid can contain about 10 wt % to about 90 wt %, about 30 wt % to about 80 wt %, about 50 wt % to about 80 wt %, or about 60 wt % to about 70 wt % of the polymer, based on a combined solids weight of the polymer and the particulate additive.

The treatment fluid can contain about 10 wt %, about 20 wt %, about 30 wt %, about 33 wt %, or about 40 wt % to about 50 wt %, about 60 wt %, about 67 wt %, about 70 wt %, about 80 wt %, or about 90 wt % of the particulate additive, based on a combined solids weight of the polymer and the particulate additive. For example, the treatment fluid can contain about 10 wt % to about 90 wt %, about 20 wt % to about 50 wt %, about 20 wt % to about 70 wt %, or about 30 wt % to about 40 wt % of the particulate additive, based on a combined solids weight of the polymer and the particulate additive.

The treatment fluid can contain about 20 wt %, about 50 wt %, or about 70 wt % to about 80 wt %, about 100 wt %, about 150 wt %, about 200 wt %, about 300 wt %, about 400 wt %, about 500 wt %, about 700 wt %, about 1,000 wt %, or more of the organic solvent, based on a combined solids weight of the polymer and the particulate additive. For example, the treatment fluid can contain about 20 wt % to about 1,000 wt %, about 20 wt % to about 500 wt %, about 20 wt % to about 200 wt %, about 100 wt % to about 1,000 wt %, about 100 wt % to about 500 wt %, about 100 wt % to about 300 wt %, about 50 wt % to about 150 wt %, or about 50 wt % to about 100 wt % of the organic solvent, based on a combined solids weight of the polymer and the particulate additive.

In one or more examples, the treatment fluid can contain about 40 wt % to about 90 wt % of the polymer, about 10 wt % to about 60 wt % of the particulate additive, and about 50 wt % to about 1,000 wt % of the organic solvent, based on a combined solids weight of the polymer and the particulate additive. In some examples, the treatment fluid can contain about 50 wt % to about 80 wt % of the polymer, about 20 wt % to about 50 wt % of the particulate additive, and about 100 wt % to about 800 wt % of the organic solvent, based on a combined solids weight of the polymer and the particulate additive. In other examples, the treatment fluid can contain about 60 wt % to about 75 wt % of the polymer, about 25 wt % to about 40 wt % of the particulate additive, and about 200 wt % to about 600 wt % of the organic solvent, based on a combined solids weight of the polymer and the particulate additive.

The treatment fluid and the aqueous downhole fluid can be combined in a variety of ratios. The treatment fluid can be added, injected, or otherwise introduced to or combined with the aqueous downhole fluid at a rate and/or in a volume to displace the organic solvent and precipitate or produce the polymeric additive composite. In some examples, the treatment fluid can be introduced to or combined with the aqueous downhole fluid in an amount of about 10 gallons (about 38 L), about 50 gallons (about 189 L), or about 70 gallons (about 265 L) to about 100 gallons (about 379 L), about 200 gallons (about 757 L), about 300 gallons (about 1,136 L), about 500 gallons (about 1,893 L), or more of the treatment fluid per 1,000 gallons (about 3,785 L) of the aqueous downhole fluid. In other examples, the treatment fluid can be introduced to or combined with the aqueous downhole fluid in an amount of about 0.1 volume percent (vol %), about 1 vol %, or about 3 vol % to about 5 vol %, about 10 vol %, about 15 vol %, about 20 vol %, about 30 vol %, about 50 vol %, or more of the treatment fluid, based on a volume of the aqueous downhole fluid combined therewith.

In one or more embodiments, the treatment fluid and the aqueous downhole fluid can be combined or otherwise mixed by passing the treatment fluid through a nozzle into the aqueous downhole fluid. The method can also include modulating a flow rate of the treatment fluid passing the through nozzle into the aqueous downhole fluid to control a size and a geometry of the polymeric additive composite produced within the subterranean formation.

In other examples, the treatment fluid and the aqueous downhole fluid can be combined by passing a first stream containing the treatment fluid through a first nozzle into the aqueous downhole fluid. A second stream containing the particulate additive, but not containing the polymer or containing a substantial amount of the polymer, can be passed through a second nozzle into the aqueous downhole fluid. The second stream can be introduced into the aqueous downhole fluid prior to, during the same time, and/or subsequent to the introduction of the first stream into the aqueous downhole fluid.

The polymeric additive composite can be in any shape or size that can be chosen based on the particular downhole application and location to disperse the particulate additive. In some examples, the polymeric additive composite can be in a particulate form, such as a plurality of particles. The specific features of the degradable polymer contained in particles of the polymeric additive composite may be modified so as to reduce the permeability of a proppant pack when intact while easing the removal of the degradable polymer when desirable. Whichever degradable polymer is utilized, the polymeric additive composite may have any shape, including but not limited to particles having the physical shape of fibers, strings, rods, platelets, shavings, flakes, ribbons, strips, spheroids, toroids, pellets, tablets, or any other physical shape.

In some embodiments, each particle of the polymeric additive composite can have any shape of a fiber, a string, a rod, or the like and can have a relatively large aspect ratio, such as to have a greater length relative to a thickness or diameter. For example, each particle of the polymeric additive composite can have an aspect ratio of greater than 10, greater than 20, greater than 30, or great than 50 to about 60, about 80, about 100, about 200, about 300, about 500, or larger. The polymeric additive composite can have an average particle size of about 1 μm to less than 1 mm, about 10 μm to less than 1 mm, or about 100 μm to less than 1 mm. In other examples, the polymeric additive composite can have an average particle size of 1 mm to about 10 mm, 1 mm to about 5 mm, or about 2 mm to about 10 mm. In other embodiments, the polymeric additive composite can adopt an asymmetrical geometry or an amorphic aspect or state, generated by the physical interactions arising from, but not limited to, fluid mixing and dispersion and/or differential solubility (e.g., bi-phase or multi-phase), such as in a confined space or volume (e.g., a pipe, a tubing, perforations, or fractures) under desired temperature and/or pressure ranges.

The method can also include degrading or dissolving the polymer contained in the polymeric additive composite to control the release of the particulate additive from the polymeric additive composite and expose the particulate additive to the aqueous downhole fluid and/or the fluid mixture. The degrading or dissolving of the polymer can be at least partially controlled by adjusting the pH value, the temperature, and/or the pressure of the aqueous downhole fluid and/or the fluid mixture, adjusting the concentration of an oxidizer contained in the aqueous downhole fluid and/or the fluid mixture, or any combination thereof.

The aqueous downhole fluid and/or the fluid mixture can independently have a pH value that is acidic, neutral, or basic. The pH of the aqueous downhole fluid and/or the fluid mixture can be lowered, increased, or otherwise adjusted by adding, injecting, or otherwise introducing one or more acids, bases, or other pH-adjusting agents into the respective fluid. In some examples, the pH of the aqueous downhole fluid and/or the fluid mixture is acceptable to degrade or dissolve the polymer contained in the polymeric additive composite without any additional adjustments of the pH value.

The aqueous downhole fluid and/or the fluid mixture can have or be adjusted to have a pH of less than 1, about 1, about 2, or about 3 to about 4, about 5, about 6, or less than 7 to degrade or dissolve the polymer. For example, the aqueous downhole fluid and/or the fluid mixture can be adjusted to have a pH of about 2 to less than 7, about 2 to about 6, or about 2 to about 5 to degrade or dissolve the polymer. In other examples, the aqueous downhole fluid and/or the fluid mixture can have or be adjusted to have a pH of about 7, about 8, or about 9 to about 10, about 11, about 12, or greater to degrade or dissolve the polymer. For example, the aqueous downhole fluid and/or the fluid mixture can have or be adjusted to have a pH of about 7 to about 12, about 8 to about 12, about 8 to about 10, or greater than 9 to less than 12, to degrade or dissolve the polymer.

The aqueous downhole fluid and/or the fluid mixture can be heated to a temperature of about 30° C., about 50° C., about 65° C., about 80° C., about 100° C., about 110° C., or about 120° C. to about 130° C., about 140° C., about 150° C., about 170° C., or greater for a time period of about 30 minutes, about 50 minutes, about 100 minutes, or about 200 minutes to about 300 minutes, about 400 minutes, about 500 minutes, or about 600 minutes. For example, the aqueous downhole fluid and/or the fluid mixture can be heated to a temperature of about 30° C. to about 150° C., about 50° C. to about 150° C., or about 100° C. to about 150° C. for about 100 minutes to about 600 minutes or about 300 minutes to about 500 minutes to degrade or dissolve the polymer.

Figure 1:
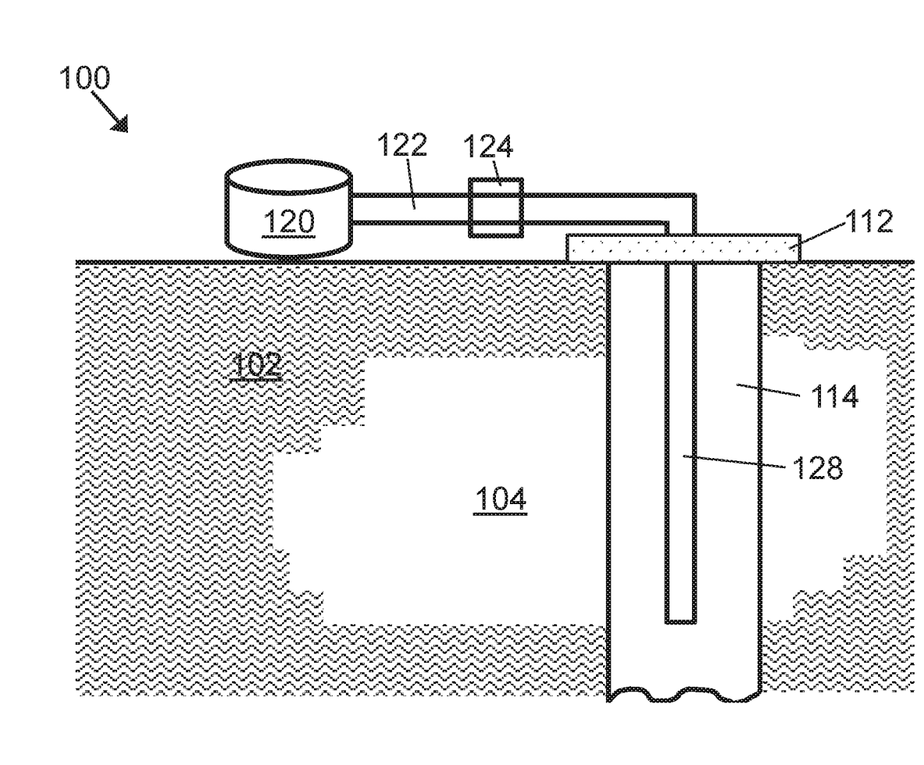
FIG. 1 is a schematic view of a delivery system that can be used to introduce treatment fluids into a subterranean formation, according to one or more embodiments.

FIG. 1 is a schematic view of a delivery system 100 that can be used to deliver or otherwise introduce one or more treatment fluids into a downhole location, such as a subterranean formation 104, according to one or more embodiments. It should be noted that while FIG. 1 generally depicts a land-based system, it is to be recognized that like systems can be operated in subsea locations as well. As depicted in FIG. 1, the delivery system 100 can include a container 120, in which one or more treatment fluids can be made, stirred, mixed, stored, or any combination thereof. For example, one or more of the polymers, one or more of the particulate additives, and one or more of the organic solvents can be in introduced or otherwise added into the container and can be mixed or otherwise combined to produce the treatment fluid. Thereafter, the treatment fluid can be stored until ready to be used. The container 120 can be, but is not limited to, one or more tanks, vessels, columns, or reactors and can include one or more mixing devices and one or more heat control devices.

The treatment fluid can be conveyed or otherwise transported from the container 120 via line 122 to one or more wellheads 112, where the treatment fluid can be introduced into one or more lines 128. The line 128 can extend from the wellhead 112 into one or more boreholes or wellbores 114 and the subterranean formation 104 each formed in the terrain 102. One or more pumps 124 can be coupled to and in fluid communication with the line 122, as shown in FIG. 1, and/or with the line 128, not shown. The pump 124 can be used to transport the treatment fluid from the container 120, through the lines 122, 124 and the wellbore 114, and into the subterranean formation 104. The pump 124 can also be used to control the pressure within the wellbore 114 and the subterranean formation 104.

One or more aqueous downhole fluids can be disposed or otherwise contained within at least the subterranean formation 104. Upon being ejected or otherwise exiting from the line 128, the treatment fluid can subsequently penetrate into the subterranean formation 104 and combine or otherwise mix with the aqueous downhole fluid to produce the polymeric additive composite and a fluid mixture within the subterranean formation 104. The fluid mixture can contain the combination of the aqueous downhole fluid and the one or more organic solvents derived from the treatment fluid.

In one or more embodiments, the polymeric additive composite can be precipitated, produced, or otherwise made within the subterranean formation 104. Prior to transporting the treatment fluid downhole, the wellbore 114 can contain or substantially contain or can be filled or substantially filled with one or more organic solvents that are compatible with the treatment fluid. For example, any of the organic solvents that can be contained in or otherwise compatible with the treatment fluid can be flowed into or otherwise contained within the wellbore 114. The organic solvent contained in the wellbore 114 can provide an initial medium for maintaining the wellbore 114 free or substantially free of the aqueous downhole fluid, water, or an alkanol. As such, the treatment fluid can pass from the line 128, through the wellbore 114, and into the subterranean formation 104. By having this initial organic solvent medium in the wellbore 114, precipitating or otherwise producing the polymeric additive composite from the treatment fluid within the wellbore 114 can be minimized or avoided.

Alternatively, in other embodiments, the polymeric additive composite can be precipitated, produced, or otherwise made within the wellbore 114. For example, the polymeric additive composite containing one or more additives (e.g., particulate additives) can be used in the wellbore 114 or transferred to and used in the subterranean formation 104 depending on the particular downhole process. Prior to transporting the treatment fluid downhole, the wellbore 114 can contain or substantially contain or can be filled or substantially filled with the aqueous downhole fluid, water, one or more alkanols, or any mixture thereof. Illustrative alkanols, can be or include, but are not limited to, methanol, ethanol, propanol, butanol, isomers thereof, or any mixture thereof. As such, the treatment fluid can be flowed or transferred from the line 128 and can be injected or otherwise introduced into the wellbore 114 to produce the polymeric additive composite therein.

It is to be recognized that the delivery system 100 is merely exemplary in nature and various additional components can be present that have not necessarily been depicted in FIG. 1 in the interest of clarity. Non-limiting additional components that can be present include, but are not limited to, supply hoppers, mixing devices, valves, condensers, adapters, joints, gauges, sensors, pumps, compressors, pressure controllers, pressure sensors, flow rate controllers, flow rate sensors, temperature sensors, or temperature control devices.

In one or more embodiments, a treatment fluid can include one or more degradable polymers containing a polylactic acid, a particulate additive containing one or more phosphonate chelating agents, and one or more organic solvents. The degradable polymer can be at least partially dissolved in the organic solvent and the particulate additive can be at least partially insoluble in the organic solvent. The organic solvent can be or include, but is not limited to, acetonitrile, dimethylformamide, acetone, methyl ethyl ketone, trifluoroacetic acid, hexafluoro-2-propanol, dioxane, ethyl lactate, dichloromethane, chloroform, or any mixture thereof.

In other embodiments, a method for treating the subterranean formation can include introducing the treatment fluid into the subterranean formation containing the aqueous downhole fluid. The treatment fluid can contain a polylactic acid, a particulate additive containing one or more chelating agents, and one or more organic solvents. The polylactic acid can be at least partially dissolved in the organic solvent and the particulate additive can be at least partially suspended in the organic solvent. The method can also include combining the treatment fluid with the aqueous downhole fluid to produce the polymeric additive composite and the fluid mixture within the subterranean formation. The polymeric additive composite contains the particulate additive at least partially or completely embedded in the polylactic acid to prevent an uncontrolled release of the particulate additive into the fluid mixture. The fluid mixture can contain the aqueous downhole fluid and the organic solvent. The method can further include degrading or dissolving the polylactic acid contained in the polymeric additive composite. Once the polylactic acid is degraded or dissolved, the particulate additive can be released from the polymeric additive composite and can be exposed to the fluid mixture.

In addition to the embodiments described above, embodiments of the present disclosure further relate to one or more of the following paragraphs:

A method for treating a subterranean formation having an aqueous downhole fluid, comprising: introducing a treatment fluid into the subterranean formation, wherein the treatment fluid comprises a polymer, a particulate additive, and an organic solvent, wherein the polymer is at least partially dissolved in the organic solvent, and wherein the particulate additive is at least partially suspended in the organic solvent; and combining the treatment fluid with the aqueous downhole fluid to produce a polymeric additive composite and a fluid mixture within the subterranean formation, wherein the polymeric additive composite comprises the particulate additive at least partially embedded in the polymer to prevent an uncontrolled release of the particulate additive into the fluid mixture.

A method for treating a subterranean formation having an aqueous downhole fluid, comprising: introducing a treatment fluid into the subterranean formation, wherein the treatment fluid comprises a polymer, a particulate additive, and an organic solvent, wherein the polymer is at least partially dissolved in the organic solvent, and wherein the particulate additive is at least partially suspended in the organic solvent; combining the treatment fluid with the aqueous downhole fluid to produce a polymeric additive composite and a fluid mixture within the subterranean formation, wherein the polymeric additive composite comprises the particulate additive at least partially embedded in the polymer to prevent an uncontrolled release of the particulate additive into the fluid mixture; and degrading or dissolving the polymer contained in the polymeric additive composite to control the release of the particulate additive from the polymeric additive composite and expose the particulate additive to the fluid mixture.

A method for treating a subterranean formation having an aqueous downhole fluid, comprising: introducing a treatment fluid into the subterranean formation, wherein the treatment fluid comprises a polylactic acid, a particulate additive, and an organic solvent, wherein the polylactic acid is at least partially dissolved in the organic solvent, and wherein the particulate additive is at least partially suspended in the organic solvent; combining the treatment fluid with the aqueous downhole fluid to produce a polymeric additive composite and a fluid mixture within the subterranean formation, wherein the polymeric additive composite comprises the particulate additive at least partially embedded in the polylactic acid; and degrading or dissolving the polylactic acid contained in the polymeric additive composite to control the release of the particulate additive from the polymeric additive composite and expose the particulate additive to the fluid mixture.

A method for treating a subterranean formation having an aqueous downhole fluid, comprising: introducing a treatment fluid into the subterranean formation, wherein the treatment fluid comprises a polylactic acid, a particulate additive, and an organic solvent, wherein the polylactic acid is at least partially dissolved in the organic solvent, and wherein the particulate additive comprises a chelating agent and is at least partially suspended in the organic solvent; combining the treatment fluid with the aqueous downhole fluid to produce a polymeric additive composite and a fluid mixture within the subterranean formation, wherein the polymeric additive composite comprises the particulate additive at least partially embedded in the polylactic acid; and degrading or dissolving the polylactic acid contained in the polymeric additive composite to control the release of the particulate additive from the polymeric additive composite and expose the particulate additive to the fluid mixture.

A treatment fluid, comprising: a polymer; a particulate additive; and an organic solvent, wherein the polymer is at least partially dissolved in the organic solvent, and wherein the particulate additive is at least partially insoluble in the organic solvent.

A treatment fluid, comprising: a polymer comprising polylactic acid and is degradable; a particulate additive comprising a phosphonate chelating agent; and an organic solvent, wherein the degradable polymer is at least partially dissolved in the organic solvent, and wherein the particulate additive is at least partially insoluble in the organic solvent.

A treatment fluid, comprising: a polymer comprising polylactic acid and is degradable; a particulate additive comprising a phosphonate chelating agent; and an organic solvent comprising acetonitrile, dimethylformamide, acetone, methyl ethyl ketone, trifluoroacetic acid, hexafluoro-2-propanol, dioxane, ethyl lactate, dichloromethane, chloroform, or any mixture thereof, wherein the degradable polymer is at least partially dissolved in the organic solvent, and wherein the particulate additive is at least partially insoluble in the organic solvent.

The method or the treatment fluid according to any one of the above paragraphs, wherein the polymer comprises a degradable polymer, and wherein the degradable polymer comprises a polyester, a poly(alkylene dicarboxylate), a polyanhydride, a polycarbonate, a poly(dioxepan-2-one), a poly(amino acid), a poly(alkylene oxide), a polyphosphazene, a polyvinyl alcohol, a polyalkene, a polybutadiene, a polyacrylate, a polystyrene, a rubber, an amide elastomer, a silicone hydrogel, a copolymer thereof, a derivative thereof, a salt thereof, a hydrate thereof, or any combination thereof.

The method or the treatment fluid according to any one of the above paragraphs, wherein the degradable polymer comprises a polyester, and wherein the polyester comprises an aliphatic polyester, a poly($\alpha$-hydroxy) acid, a poly(hydroxy alkanoate), a poly($\beta$-hydroxy alkanoate), a poly($\omega$-hydroxy alkanoate), a poly(orthoester), a copolymer thereof, a derivative thereof, a salt thereof, a hydrate thereof, or any combination thereof.

The method or the treatment fluid according to any one of the above paragraphs, wherein the polymer comprises a polylactic acid (PLA), a polyglycolic acid (PGA), a polylactide, a polyglycolide, a copolymer thereof, a derivative thereof, a salt thereof, a hydrate thereof, or any combination thereof.

The method or the treatment fluid according to any one of the above paragraphs, wherein the polymer comprises a degradable aliphatic polyester.

The method or the treatment fluid according to any one of the above paragraphs, wherein the polymeric additive composite comprises a plurality of particles.

The method or the treatment fluid according to any one of the above paragraphs, wherein the fluid mixture comprises the aqueous downhole fluid and the organic solvent.

The method or the treatment fluid according to any one of the above paragraphs, wherein the particulate additive comprises a chelating agent, a scale inhibitor, a corrosion inhibitor, an oxidizer, a breaker, an etchant, an acid, a base, a pH control agent, a dispersant, a surfactant, a flocculant, a gel stabilizer, a gelling agent, a foaming agent, an antifoaming agent, or any combination thereof.

The method or the treatment fluid according to any one of the above paragraphs, wherein the particulate additive comprises a phosphonate chelating agent.

The method or the treatment fluid according to any one of the above paragraphs, wherein the phosphonate chelating agent comprises N-(phosphonomethyl)iminodiacetic acid (PMIDA), aminomethylphosphonic acid (AMPA), vinylphosphonic acid, dimethyl methylphosphonate (DMMP), 1-hydroxyethylidene-1,1-diphosphonic acid (HEDP), aminotris(methylenephosphonic acid) (ATMP), ethylenediaminetetra(methylenephosphonic acid) (EDTMP), tetramethylenediaminetetra(methylenephosphonic acid) (TDTMP), hexamethylenediaminetetra(methylenephosphonic acid) (HDTMP), diethylenetriaminepenta(methylenephosphonic acid) (DTPMP), phosphonobutanetricarboxylic acid (PBTC), 2-carboxyethyl phosphonic acid (CEPA), 2-hydroxyphosphonocarboxylic acid (HPAA), aminotris(methylenephosphonic acid) (AMP), N,N-bis(phosphonomethyl)glycine (BPMG), a salt thereof, a hydrate thereof, an acid thereof, an ester thereof, a derivative thereof, or any combination thereof.

The method or the treatment fluid according to any one of the above paragraphs, wherein the particulate additive comprises a chelating agent, and wherein the chelating agent comprises glutamic acid diacetic acid (GLDA), methylglycine diacetic acid (MGDA), $\beta$-alanine diacetic acid ($\beta$-ADA), ethylenediaminedisuccinic acid, S,S-ethylenediaminedisuccinic acid (EDDS), iminodisuccinic acid (IDS), hydroxyiminodisuccinic acid (HIDS), polyamino disuccinic acids, N-bis[2-(1,2-dicarboxyethoxyl)ethyl]glycine (BCA6), N-bis[2-(1,2-dicarboxyethoxyl)ethyl]aspartic acid (BCA5), N-bis[2-(1,2-dicarboxyethoxyl)ethyl]methylglycine (MCBA5), N-tris[(1,2-dicarboxyethoxy)ethyl]amine (TCA6), N-bis[2-(carboxymethoxy)ethyl]glycine (BCA3), N-bis[2-(methylcarboxymethoxy)ethyl]glycine (MCBA3), N-methyliminodiacetic acid (MIDA), iminodiacetic acid (IDA), N-(2-acetamido)iminodiacetic acid (ADA), hydroxymethyliminodiacetic acid, 2-(2-carboxyethylamino) succinic acid (CEAA), 2-(2-carboxymethylamino) succinic acid (CMAA), diethylenetriamine-N,N''-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylenediamine-N,N'-disuccinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N,N-diacetic acid, aspartic acid-N-monoacetic acid, a polymer thereof, a salt thereof, a hydrate thereof, an acid thereof, an ester thereof, a derivative thereof, or any combination thereof.

The method or the treatment fluid according to any one of the above paragraphs, wherein the polymer comprises a polylactic acid (PLA), a copolymer thereof, a derivative thereof, a salt thereof, a hydrate thereof, or any combination thereof, and wherein the particulate additive comprises N-(phosphonomethyl)iminodiacetic acid (PMIDA).

The method or the treatment fluid according to any one of the above paragraphs, wherein the organic solvent comprises acetonitrile, dimethylformamide, acetone, methyl ethyl ketone, trifluoroacetic acid, hexafluoro-2-propanol, dioxane, ethyl lactate, dichloromethane, chloroform, or any mixture thereof.

The method or the treatment fluid according to any one of the above paragraphs, wherein combining the treatment fluid with the aqueous downhole fluid further comprises passing the treatment fluid through a nozzle into the aqueous downhole fluid.

The method or the treatment fluid according to any one of the above paragraphs, further comprising modulating a flow rate of the treatment fluid passing through the nozzle to control a size and a geometry of the polymeric additive composite produced within the subterranean formation.

The method or the treatment fluid according to any one of the above paragraphs, wherein combining the treatment fluid with the aqueous downhole fluid further comprises passing a first stream comprising the treatment fluid through a first nozzle into the aqueous downhole fluid and passing a second stream comprising the particulate additive through a second nozzle into the aqueous downhole fluid.

The method according to any one of the above paragraphs, further comprising degrading or dissolving the polymer contained in the polymeric additive composite to control the release of the particulate additive from the polymeric additive composite and expose the particulate additive to the fluid mixture.

The method according to any one of the above paragraphs, further comprising at least partially controlling the degrading or dissolving of the polymer by controlling a pH of the fluid mixture, a temperature of the fluid mixture, a concentration of an oxidizer contained in the fluid mixture, or any combination thereof.

The method according to any one of the above paragraphs, wherein the fluid mixture has a pH of about 2 to less than 7 to degrade or dissolve the polymer.

The method according to any one of the above paragraphs, wherein the fluid mixture has a pH of about 7 to about 12 to degrade or dissolve the polymer. The fluid mixture having a caustic or basic pH value (pH of greater than 7) can be used when higher viscosity fluids are desired to overcome breakdown or closure pressure in fracturing treatments.

The method according to any one of the above paragraphs, wherein the fluid mixture is at a temperature of about 30° C. to about 150° C. to degrade or dissolve the polymer.

The method according to any one of the above paragraphs, wherein the fluid mixture is at a temperature of about 50° C. to about 150° C. to degrade or dissolve the polymer.

The method according to any one of the above paragraphs, wherein the fluid mixture is at a temperature of about 30° C. to about 100° C. for about 100 minutes to about 600 minutes or about 300 minutes to about 500 minutes to degrade or dissolve the polymer.

The method or the treatment fluid according to any one of the above paragraphs, wherein the treatment fluid comprises about 40 wt % to about 90 wt % of the polymer, about 10 wt % to about 60 wt % of the particulate additive, and about 50 wt % to about 1,000 wt % of the organic solvent, based on a combined solids weight of the polymer and the particulate additive.

The method or the treatment fluid according to any one of the above paragraphs, wherein about 0.1 vol % to about 50 vol % of the treatment fluid is combined with the aqueous downhole fluid, based on a volume of the aqueous downhole fluid combined therewith.

The method or the treatment fluid according to any one of the above paragraphs, wherein the aqueous downhole fluid has a pH of less than 7.

The method or the treatment fluid according to any one of the above paragraphs, wherein the aqueous downhole fluid has a pH of about 7 or greater than 7, such as, but not limited to, about 8 to about 12.

The method or the treatment fluid according to any one of the above paragraphs, wherein the aqueous downhole fluid include a cross-linked guar, one or more guar-derivatives, one or more cellulosic type fluids, or any combination thereof.

The method or the treatment fluid according to any one of the above paragraphs, wherein the aqueous downhole fluid has a pH of about 2 to about 6.

The method or the treatment fluid according to any one of the above paragraphs, wherein the chelating agent comprises a phosphonate chelating agent, wherein the organic solvent comprises acetonitrile, dimethylformamide, acetone, methyl ethyl ketone, trifluoroacetic acid, hexafluoro-2-propanol, dioxane, ethyl lactate, dichloromethane, chloroform, or any mixture thereof, and wherein the degrading or dissolving of the polymer is at least partially controlled by a pH of the fluid mixture, a temperature of the fluid mixture, a concentration of an oxidizer contained in the fluid mixture, or any combination thereof.

This discussion is directed to various embodiments of the invention. The drawing figures are not necessarily to scale. Certain features of the embodiments can be shown exaggerated in scale or in somewhat schematic form and some details of conventional elements may not be shown in the interest of clarity and conciseness. Although one or more of these embodiments can be preferred, the embodiments disclosed should not be interpreted, or otherwise used, as limiting the scope of the disclosure, including the claims. It is to be fully recognized that the different teachings of the embodiments discussed can be employed separately or in any suitable combination to produce desired results. In addition, one skilled in the art will understand that the description has broad application, and the discussion of any embodiment is meant only to be exemplary of that embodiment, and not intended to intimate that the scope of the disclosure, including the claims, is limited to that embodiment.

Within this document, a reference identifier can be used as a general label, for example "101," for a type of element and alternately used to indicate a specific instance or characterization, for example "101A" and 101B," of that same type of element.

Certain terms are used throughout the description and claims to refer to particular features or components. As one skilled in the art will appreciate, different persons may refer to the same feature or component by different names. This document does not intend to distinguish between components or features that differ in name but not function, unless specifically stated. In the discussion and in the claims, the terms "including" and "comprising" are used in an open-ended fashion, and thus should be interpreted to mean "including, but not limited to . . . ." Also, the term "couple" or "couples" is intended to mean either an indirect or direct connection. The use of "top," "bottom," "above," "below," and variations of these terms is made for convenience, but does not require any particular orientation of the components.

Certain embodiments and features have been described using a set of numerical upper limits and a set of numerical lower limits. It should be appreciated that ranges including the combination of any two values, e.g., the combination of any lower value with any upper value, the combination of any two lower values, and/or the combination of any two upper values are contemplated unless otherwise indicated. Certain lower limits, upper limits and ranges appear in one or more claims below. All numerical values are "about" or "approximately" the indicated value, and take into account experimental error and variations that would be expected by a person having ordinary skill in the art.

Reference throughout this specification to "one embodiment," "an embodiment," or similar language means that a particular feature, structure, or characteristic described in connection with the embodiment can be included in at least one embodiment of the present disclosure. Thus, appearances of the phrases "in one embodiment," "in an embodiment," and similar language throughout this specification may, but do not necessarily, all refer to the same embodiment.

Although the present invention has been described with respect to specific details, it is not intended that such details should be regarded as limitations on the scope of the invention, except to the extent that they are included in the accompanying claims.

What is claimed is:

1. A method for treating a subterranean formation, comprising:
Introducing an aqueous downhole fluid into the subterranean formation;
introducing a treatment fluid into the subterranean formation, wherein the treatment fluid comprises a polymer comprising polylactic acid, a solid particulate additve comprising a chelating agent, and an organic solvent, wherein the polymer is at least partially dissolved in the organic solvent, and wherein the solid particulate additive is insoluble in and at least partially suspended in the organic solvent; and combining the treatment fluid with the aqueous downhole fluid to produce a fluid mixture within the subterranean formation, wherein together the combining comprises precipitating the polymer and the solid particulate additive together as a polymeric additive composite, wherein the polymeric additive composite comprises the solid particulate additive embedded in the polymer to prevent an uncontrolled release of the solid particulate additive into the fluid mixture.

2. The method of claim 1, wherein the treatment fluid comprises about 40 wt. % to about 90 wt. % of the polymer and about 10 wt. % to about 60 wt. % of the solid particulate additive, based on a combined solids weight of the polymer and the solid particulate additive.

3. The method of claim 2, wherein the treatment fluid further comprises about 50 wt % to about 1,000 wt % of the organic solvent, based on a combined solids weight of the polymer and the solid particulate additive.

4. The method of claim 1, wherein about 0.1 vol % to about 50 vol % of the treatment fluid is combined with the aqueous downhole fluid, based on a volume of the aqueous downhole fluid combined therewith.

5. The method of claim 1, further comprising degrading or dissolving the polymer contained in the polymeric additive composite to control the release of the solid particulate additive from the polymeric additive composite and expose the solid particulate additive to the fluid mixture.

6. The method of claim 5, further comprising at least partially controlling the degrading or dissolving of the polymer by controlling a pH of the fluid mixture, a temperature of the fluid mixture, a concentration of an oxidizer contained in the fluid mixture, or any combination thereof.

7. The method of claim 6, wherein the fluid mixture has a pH of about 2 to less than 7 to degrade or dissolve the polymer, or wherein the fluid mixture is at a temperature of about 30° C. to about 150° C. to degrade or dissolve the polymer.

8. The method of claim 1, wherein the chelating agent comprises N-(phosphonomethyl)iminodiacetic acid (PMIDA), aminomethylphosphonic acid (AMPA), vinylphosphonic acid, dimethyl methylphosphonate (DMMP), 1-hydroxyethylidene-1,1-diphosphonic acid (HEDP), aminotris(methylenephosphonic acid) (ATMP), ethylenediaminetetra(methylenephosphonic acid) (EDTMP), tetramethylenediaminetetra(methylenephosphonic acid) (TDTMP), hexamethylenediaminetetra(methylenephosphonic acid) (HDTMP), diethylenetriaminepenta(methylenephosphonic acid) (DTPMP), phosphonobutanetricarboxylic acid (PBTC), 2-carboxyethyl phosphonic acid (CEPA), 2-hydroxyphosphonocarboxylic acid (HPAA), aminotris(methylenephosphonic acid) (AMP), N,N-bis(phosphonomethyl)glycine (BPMG), a salt thereof, a hydrate thereof, an acid thereof, an ester thereof, a derivative thereof or any combination thereof.

9. The method of claim 1, wherein the chelating agent comprises glutamic acid diacetic acid (GLDA), methylglycine diacetic acid (MGDA), beta-alanine diacetic acid (beta-ADA), ethylenediaminedisuccinic acid, S,S-ethylenediaminedisuccinic acid (EDDS), iminodisuccinic acid (IDS), hydroxyiminodisuccinic acid (HIDS), polyamino disuccinic acids, N-bis[2-(1,2-dicarboxyethoxyl)ethyl]glycine (BCA6), N-bis[2-(1,2-dicarboxyethoxyl)ethyl] aspartic acid (BCA5), N-bis[2-(1,2-dicarboxyethoxyl)ethyl]methylglycine (MCBA5), N-tris[(1,2-dicarboxyethoxy)ethyl] amine (T C A6), N-bis [2-(carboxymethoxy)ethyl] glycine (BCA3), N-bis[2-(methylcarboxymethoxy)ethyl]glycine (MCBA3), N-methyliminodiacetic acid (MID A), iminodiacetic acid (IDA), N-(2-acetamido)iminodiacetic acid (ADA), hydroxymethyliminodiacetic acid, 2-(2-carboxyethylamino) succinic acid (CEAA), 2-(2-carboxymethylamino) succinic acid (CMAA), diethylenetriamine-N,N''-disuccinic acid, triethylenetetramine-N,N'''-disuccinic acid, 1,6-hexamethylenediamine-N,N'-disuccinic acid, tetraethylenepentamine-N,N''''-disuccinic acid, 2-hydroxypropylene-1,3-diamine-N,N'-disuccinic acid, 1,2-propylenediamine-N,N'-disuccinic acid, 1,3-propylene diamine-N,N'-disuecinic acid, cis-cyclohexanediamine-N,N'-disuccinic acid, trans-cyclohexanediamine-N,N'-disuccinic acid, ethylenebis(oxyethylenenitrilo)-N,N'-disuccinic acid, glucoheptanoic acid, cysteic acid-N,N-diacetic acid, cysteic acid-N-monoacetic acid, alanine-N-monoacetic acid, N-(3-hydroxysuccinyl) aspartic acid, N-[2-(3-hydroxysuccinyl)]-L-serine, aspartic acid-N,N-diacetic acid, aspartic acid-N-monoacetic acid, a polymer thereof, a salt thereof, a hydrate thereof, an acid thereof, an ester thereof, a derivative thereof, or any combination thereof.

10. The method of claim 1, wherein the polymer comprises a degradable polymer, and wherein the degradable polymer comprises a polyester, a poly(alkylene dicarboxylate), a polyanhydride, a polycarbonate, a poly(dioxepan-2-one), a poly(amino acid), a poly(alkylene oxide), a polyphosphazene, a polyvinyl alcohol, a polyalkene, a polybutadiene, a polyacrylate, a polystyrene, a rubber, an amide elastomer, a silicone hydrogel, a copolymer thereof, a derivative thereof, a salt thereof, a hydrate thereof, or any combination thereof.

11. The method of claim 1, wherein the polymer comprises a polylactic acid (PLA), a polyglycolic acid (PGA), a polylactide, a polyglycolide, a copolymer thereof, a derivative thereof, a salt thereof, a hydrate thereof, or any combination thereof.

12. The method of claim 1, wherein the polymer comprises a polylactic acid (PLA), a copolymer thereof, a derivative thereof, a salt thereof, a hydrate thereof, or any combination thereof, and wherein the particulate additive comprises N-(phosphonomethyl)iminodiacetic acid (PMIDA).

13. The method of claim 1, wherein the organic solvent comprises acetonitrile, dimethylformamide, acetone, methyl ethyl ketone, trifluoroacetic acid, hexafluoro-2-propanol, dioxane, ethyl lactate, dichloromethane, chloroform, or any mixture thereof.

14. The method of claim 1, wherein combining the treatment fluid with the aqueous downhole fluid further comprises:
adding the treatment fluid to the aqueous downhole fluid at a rate and/or in a volume to displace the organic solvent and precipitate the polymeric additive composite, the adding comprising: passing the treatment fluid through a nozzle into the aqueous downhole fluid via a line extending from a wellhead into the subterranean formation; and modulating a flow rate of the treatment fluid passing through the nozzle to control an average particle size and a geometry of particles of the polymeric additive composite precipitated within the subterranean formation.

15. A method for treating a subterranean formation, comprising:
introducing an aqueous downhole fluid into the subterranean formation;

introducing a treatment fluid into the subterranean formation, wherein the treatment fluid comprises a polylactic acid, a solid particulate additive, and an organic solvent, wherein the polylactic acid is at least partially dissolved in the organic solvent, and wherein the solid particulate additive comprises a chelating agent and is insoluble in and at least partially suspended in the organic solvent;

combining the treatment fluid with the aqueous downhole fluid to produce a polymeric additive composite and a fluid mixture within the subterranean formation, wherein the combining comprises precipitating the polymer and the solid particulate additive together as the polymeric additive composite, wherein the polymeric additive composite comprises the solid particulate additive at least partially embedded in the polylactic acid; and degrading or dissolving the polylactic acid contained in the polymeric additive composite to control the release of the solid particulate additive from the polymeric additive composite and expose the solid particulate additive to the fluid mixture.

16. The method of claim 15, wherein the treatment fluid comprises about 40 wt. % to about 90 wt. % of the polymer, about 10 wt. % to about 60 wt. % of the solid particulate additive, and about 50 wt. % to about 1,000 wt. % of the organic solvent, based on a combined solids weight of the polymer and the solid particulate additive.

17. The method of claim 15, wherein the chelating agent comprises a phosphonate chelating agent, wherein the organic solvent comprises acetonitrile, dimethylformamide, acetone, methyl ethyl ketone, trifluoroacetic acid, hexafluoro-2-propanol, dioxane, ethyl lactate, dichloromethane, chloroform, or any mixture thereof, and wherein the degrading or dissolving of the polymer is at least partially controlled by a pH of the fluid mixture, a temperature of the fluid mixture, a concentration of an oxidizer contained in the fluid mixture, or any combination thereof.

18. The method of claim 15, wherein the polymer comprises polylactic acid and is degradable, the chelating agent comprises N-(phosphonomethyl)iminodiacetic acid (PMIDA), aminomethylphosphonic acid (AMPA), vinylphosphonic acid, dimethyl methylphosphonate (DMMP), 1-hydroxyethylidene-1,1-diphosphonic acid (HEDP), aminotris (methylenephosphonic acid) (ATMP), ethylenediaminetetra(methylenephosphonic acid) (EDTMP), tetramethylenediaminetetra(methylenephosphonic acid) (TDTMP), hexamethylenediaminetetra(methylenephosphonic acid) (HDTMP), diethylenetriaminepenta(methylenephosphonic acid) (DTPMP), phosphonobutanetricarboxylic acid (PBTC), 2-carboxyethyl phosphonic acid (CEPA), 2-hydroxyphosphonocarboxylic acid (HPAA), aminotris(methylenephosphonic acid) (AMP), N,N-bis(phosphonomethyl)glycine (BPMG), a salt thereof, a hydrate thereof, an acid thereof, an ester thereof, a derivative thereof, or any combination thereof, and the organic solvent comprises acetonitrile, dimethylformamide, acetone, methyl ethyl ketone, trifluoroacetic acid, hexafluoro-2-propanol, dioxane, ethyl lactate, dichloromethane, chloroform, or any mixture thereof.

\* \* \* \* \*